United States Patent   (10) Patent No.: US 11,231,068 B2
Morishige et al.       (45) Date of Patent:     Jan. 25, 2022

(54) SLIDE BEARING (71) Applicant: OILES CORPORATION, Tokyo (JP)

(72) Inventors: Kouichi Morishige, Fujisawa (JP);
Keisuke Imagawa, Fujisawa (JP)

(73) Assignee: GILES CORPORATION, Tokyo (JP)

( * ) Notice: Subject to any disclaimer, the term of this patent is extended or adjusted under 35 U.S.C. 154(b) by 0 days.

(21) Appl. No.: 16/753,575

(22) PCT Filed: Sep. 27, 2018

(86) PCT No.: PCT/JP2018/036065
§ 371 (c)(1),
(2) Date: Apr. 3, 2020

(87) PCT Pub. No.: WO2019/069795
PCT Pub. Date: Apr. 11, 2019

(65) Prior Publication Data
US 2020/0291988 A1  Sep. 17, 2020

(30) Foreign Application Priority Data

Oct. 6, 2017 (JP) .............................. JP2017-196263

(51) Int. Cl.
F16C 17/04 (2006.01)
F16C 33/10 (2006.01)
F16C 33/20 (2006.01)

(52) U.S. Cl.
CPC ............ *F16C 17/04* (2013.01); *F16C 33/102* (2013.01); *F16C 33/20* (2013.01); *B60G 2204/418* (2013.01)

(58) Field of Classification Search
CPC ........ F16C 17/04; F16C 17/10; F16C 17/107; F16C 17/18; F16C 33/20; F16C 33/201;
(Continued)

(56) References Cited

U.S. PATENT DOCUMENTS 10,344,799 B2 *  7/2019  Sekine ................... F16C 33/20
10,421,329 B2 *  9/2019  Takahashi ................ F16F 9/54
(Continued)

FOREIGN PATENT DOCUMENTS

CN    103547822 A    1/2014
EP    1 548 303      6/2005
(Continued)

OTHER PUBLICATIONS

Machine Translation of JP-2014040869-A (Year: 2014).*
(Continued)

*Primary Examiner* — Alan B Waits
(74) *Attorney, Agent, or Firm* — Nixon & Vanderhye P.C.

(57) ABSTRACT

Provided is a slide bearing capable of sustaining sliding performance over long period.
A slide bearing has an upper case (2) configured to be attached to an upper support for attachment of a suspension to a vehicle body, a lower case (3) rotatably combined with the upper case (2) to form an annular space (7); and an annular center plate (4) and an annular sliding sheet (5) both placed within the annular space (7). The center plate (4) includes a bearing surface (40) slidable with the sliding sheet (5) and an annular groove (42) formed on the bearing surface (40) so as to hold lubricant. The annular groove (42) has an inner circumferential surface (43a) inclining down from the opening section toward the groove bottom section as it goes outwardly in the radial direction and an outer circumferential surface (43b) inclining down from the opening section toward the groove bottom section as it goes inwardly in the radial direction. A line P of intersection between the inner circumferential surface (43a) and the outer circumferential surface (43b) is located closer to the bearing surface (40) than to a back face (41) of the center plate (4).

11 Claims, 11 Drawing Sheets (58) Field of Classification Search
CPC .............. F16C 2326/05; F16C 33/102; B60G 2204/418
See application file for complete search history.

(56) References Cited

U.S. PATENT DOCUMENTS

| | | | | |
|---|---|---|---|---|
| 10,746,224 B2* | 8/2020 | Sekine | .................... | F16C 17/04 |
| 2004/0130115 A1* | 7/2004 | Kellam | .................. | F16C 33/74 |
| | | | | 280/124.147 |
| 2006/0140523 A1* | 6/2006 | Miyata | .................... | F16C 17/04 |
| | | | | 384/420 |
| 2006/0215944 A1* | 9/2006 | Watai | ..................... | F16C 17/04 |
| | | | | 384/420 |
| 2008/0310780 A1* | 12/2008 | Watai | ..................... | F16C 17/18 |
| | | | | 384/420 |
| 2008/0317394 A1* | 12/2008 | Blanke | .................... | B60G 7/02 |
| | | | | 384/138 |
| 2017/0146056 A1 | 5/2017 | Morishige et al. | | |
| 2018/0370317 A1 | 12/2018 | Takahashi et al. | | |

FOREIGN PATENT DOCUMENTS

| | | | | |
|---|---|---|---|---|
| EP | 3 401 561 | | 11/2018 | |
| JP | 2003269458 A | * | 9/2003 | |
| JP | 2004-130115 A | | 4/2004 | |
| JP | 2004-176728 | | 6/2004 | |
| JP | 2008-175349 A | | 7/2008 | |
| JP | 2014040869 A | * | 3/2014 | ............. F16C 33/74 |
| JP | 2017-122499 A | | 7/2017 | |
| JP | 2017-125598 A | | 7/2017 | |
| WO | 2004/031601 A1 | | 4/2004 | |
| WO | 2017/119409 | | 7/2017 | |
| WO | 2017/122646 | | 7/2017 | |

OTHER PUBLICATIONS

Machine Translation of JP-2003269458-A (Year: 2003).*
International Search Report for PCT/JP2018/036065 dated Jan. 8, 2019, 3 pages.
Office Action with Search Report dated May 6, 2021 issued in Chinese Application No. 201880063893.0 with English translation (5 pages).
Supplementary European Search Report dated Jun. 14, 2021 issued in European Application No. 18 86 4735 (3 pages).

* cited by examiner

SLIDE BEARING

This application is the U.S. national phase of International Application No. PCT/JP2018/036065 filed Sep. 27, 2018 which designated the U.S. and claims priority to Japanese Patent Application No. 2017-196263 filed Oct. 6, 2017, the entire contents of each of which are hereby incorporated by reference.

TECHNICAL FIELD

The present invention relates to a slide bearing for supporting a load, and in particular relates to a slide bearing for supporting a load on a shaft member, such as a suspension for a vehicle.

BACKGROUND ART

A strut type suspension intended for use of a front wheel of an automobile has a structure in which a piston rod, a shock absorber and a coil spring are combined together, where the shock absorber is rotatable together with the coil spring in response to a steering operation. Accordingly, in order to support a load on the strut type suspension while allowing smooth rotational motion of the shock absorber and the coil spring, a bearing is usually installed between an upper mount that is provided as a mounting mechanics for mounting the strut type suspension onto a vehicle body and an upper spring seat that is provided as a spring seat for supporting an upper end of the coil spring.

For example, the Patent Literature 1 discloses a slide bearing for the strut type suspension. This slide bearing has an upper case to be attached to the upper mount, a lower case rotatably combined with the upper case so as to be attached to the upper spring seat, and an annular center plate and an annular sliding sheet both placed within an annular space created by the upper case and the lower case combined with each other.

Here, the upper case is provided with an annular load transmission surface which forms an upper interior surface of the annular space created by the upper case and the lower case combined with each other. The center plate is provided with an annular bearing surface for supporting a load to be transmitted from the load transmission surface of the upper case through the sliding sheet. This bearing surface is provided with an annular groove along a circumferential direction, and lubricant is filled in this annular groove. The sliding sheet is placed between the load transmission surface of the upper case and the bearing surface of the center plate, and provided with a sliding surface in a slidable contact with the bearing surface of the center plate.

For the slide bearing with the above structure, the load on the strut type suspension, through the load transmission surface of the upper case and the sliding sheet, is supported by the bearing surface of the center plate. The lubricant filled in the annular groove on the bearing surface of the center plate comes to lubricate this slide bearing, thereby allowing smooth rotational motion of the shock absorber and the coil spring.

CITATION LIST

Patent Literature

Patent Literature 1: Japanese Unexamined Patent Application Laid-Open No. 2004-176728

SUMMARY OF INVENTION

Technical Problem

The load on the strut type suspension varies in direction depending on vehicle driving condition or the like. For the slide bearing disclosed in the Patent Literature 1, variation in direction of the load on the strut type suspension may induce placement of an offset load on the sliding sheet and the center plate to cause a partial contact between the sliding surface of sliding sheet and the bearing surface of the center plate. In this case, a gap is generated between the sliding surface of the sliding sheet and the bearing surface of the center plate and then the lubricant is pushed out through this gap. The repetitive occurrence of such a situation due to the repetitive use over the years may result in decrease the lubricant filled in the annular groove on the bearing surface of the center plate, thereby leading to not enough lubrication for the bearing surface. Consequently, torque necessary to cause relative rotation between the upper case and the lower case increases from an initial state, leading to a change in feeling of steering operation.

The present invention has been made in view of the above situation, and an object of the invention is to provide a slide bearing capable of sustaining a sliding performance over long period.

Solution to Problem

In response to the above issue, a slide bearing according to the present invention has an annular groove on a bearing surface of a center plate facing a sliding sheet and having an opening section and a groove bottom section, the annular groove has the follow configuration: the annular groove is provided with an inner circumferential surface inclining from the opening section toward the groove bottom section as it goes outwardly in a radial direction and an outer circumferential surface inclining from the opening section toward the groove bottom section as it goes inwardly in the radial direction, and a line of intersection between the inner circumferential surface and the outer circumferential surface is positioned closer to a bearing surface than to a back face that is a surface located on an opposite side of the bearing surface of the center plate.

For example, the present invention provides a slide bearing for supporting a load, and the slide bearing has the following:

an upper case;
a lower case combined with the upper case;
a center plate in a substantial annular shape, being located between the upper case and the lower case; and
a sliding sheet in a substantial annular shape, being located between the center plate and the upper case or between the center plate and the lower case,
the center plate comprising:
a bearing surface slidable with the sliding sheet, and
an annular groove formed on the bearing surface and including an opening section and a groove bottom section,
the annular groove comprising:
an inner circumferential surface inclining from the opening section toward the groove bottom section as it goes outwardly in a radial direction, and
an outer circumferential surface inclining from the opening section toward the groove bottom section as it goes inwardly in the radial direction, wherein:

a line of intersection between the inner circumferential surface and the outer circumferential surface is positioned closer to the bearing surface than to a back face of the center plate; and the back face is a face located on an opposite side from the bearing surface.

Advantageous Effects of Invention

According to the present invention, when the load is applied on the slide bearing and pushes the center plate against the sliding sheet, in the annular groove formed on the bearing surface of the center plate, the inner circumferential surface becomes bent inwardly in the radial direction to come into a contact with the sliding sheet and the outer circumferential surface becomes bent outwardly in the radial direction to be in a contact with the sliding sheet. In addition, since the line of intersection between the inner circumferential surface and the outer circumferential surface is located closer to the bearing surface than to the back face of the center plate, the inner circumferential surface and the outer circumferential surface inside the annular groove each slope gradually with respect to a surface perpendicular to an axis, and therefore the inner circumferential surface is capable of easily bending inwardly in the radial direction and the outer circumferential surface is capable of easily bending outwardly in the radial direction, under the application of an axial load. Consequently, pushing the sliding sheet against the center plate increases a contact area between the center plate and the sliding sheet to provide a more improved sealability for sealing in a lubricant filled in the annular groove; this preventing the lubricant on the bearing surface from being pushed out even if the sliding sheet and the center plate subject to offset load, thus reducing loss of the lubricant filled in the annular groove. This enables a sliding performance to be kept over long period.

DESCRIPTION OF EMBODIMENTS

In the following, one embodiment of the present invention will be described.

Figure 1:
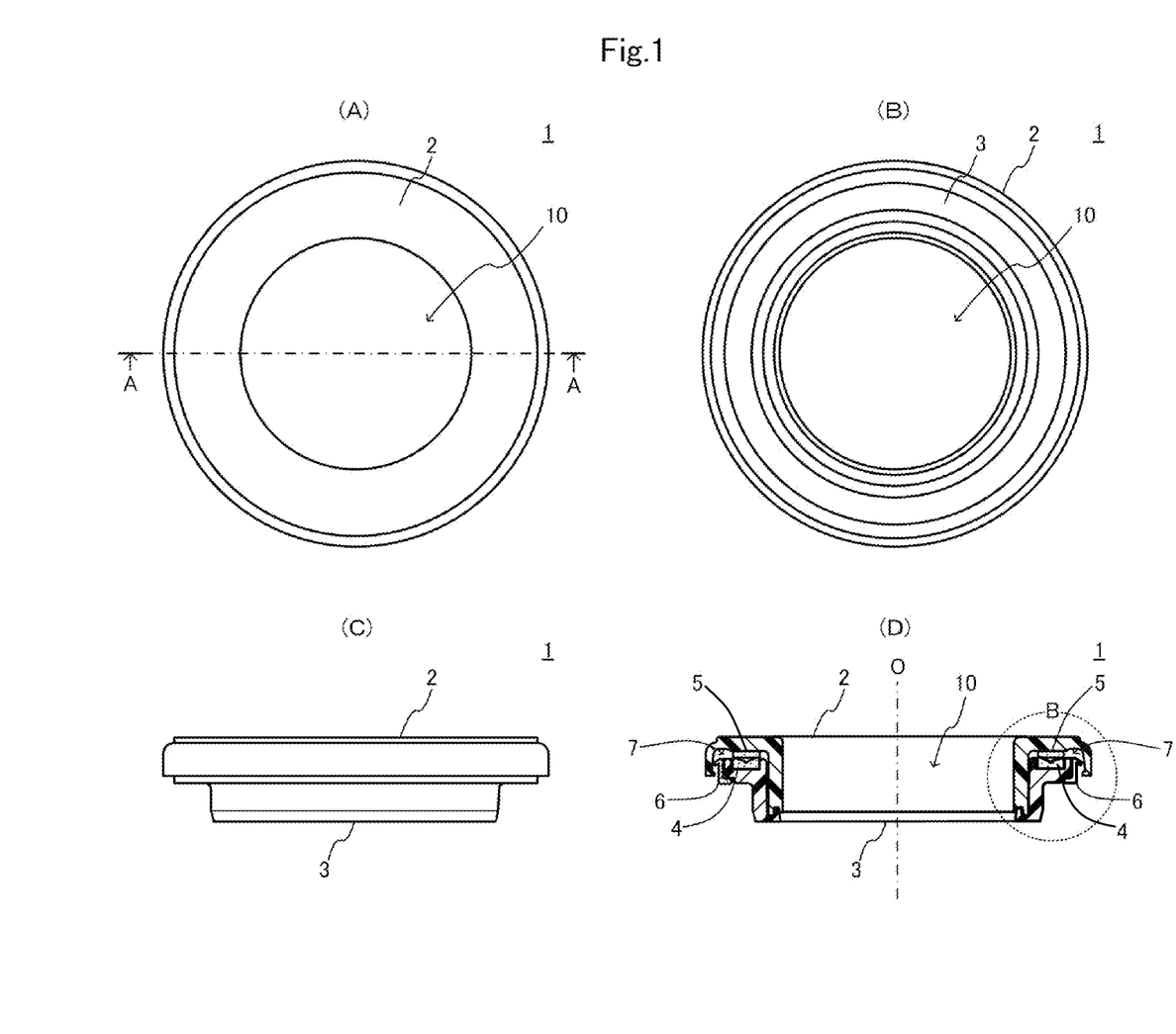
FIG. 1(A), FIG. 1(B), and FIG. 1(C) are respectively a plan view, a bottom view, and a front view, of a slide bearing 1 according to one embodiment of the present invention.
FIG. 1(D) is an A-A cross sectional view of the slide bearing 1 as illustrated in FIG. 1(A).
Figure 2:
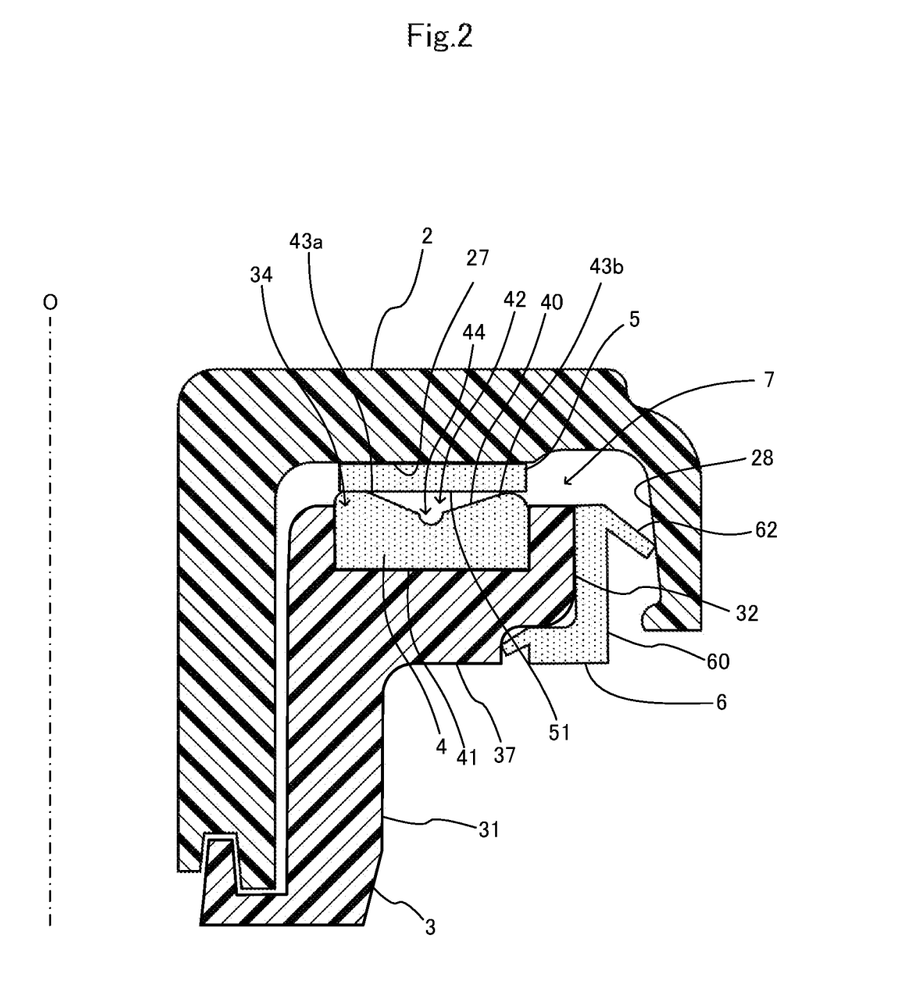
FIG. 2 is an enlarged view of the part B of the slide bearing 1 as illustrated in FIG. 1(D).

FIG. 1(A), FIG. 1(B), and FIG. 1(C) are respectively a plan view, a bottom view, and a front view, of a slide bearing 1 according to one embodiment of the present invention, and FIG. 1(D) is an A-A cross sectional view of the slide bearing 1 as illustrated in FIG. 1(A). FIG. 2 is an enlarged view of the part B of the slide bearing 1 as illustrated in FIG. 1(D).

The slide bearing 1 according to the present embodiment, includes a holding hole 10 for holding a shock absorber (not illustrated in the figures) of a suspension on a vehicle (e.g. a strut type suspension) within, thus being capable of supporting a load of a vehicle body to be applied on the suspension while allowing rotational motion of the shock absorber to be held in this holding hole 10.

As illustrated in the figures, the slide bearing 1 has an upper case 2, a lower case 3 rotatably combined with the upper case 2 to create an annular space 7 between the upper case 2 and the lower case 3, a center plate 4 in a substantial annular shape and a sliding sheet 5 in a substantial annular shape both placed within this annular space 7, a dust seal 6 for preventing intrusion of dust into this annular space 7, and a lubricant, such as lubricating grease, held by the center plate 4 although not illustrated.

The upper case 2 is made of thermoplastics excellent in sliding properties, such as polyacetal resin impregnated with lubricating oil as necessary, and is, with the shock absorber of the suspension inserted therein, attachable to an upper mount (not illustrated in the figures) that is provided as a mounting mechanism for mounting the suspension onto the vehicle body.

Figure 3:
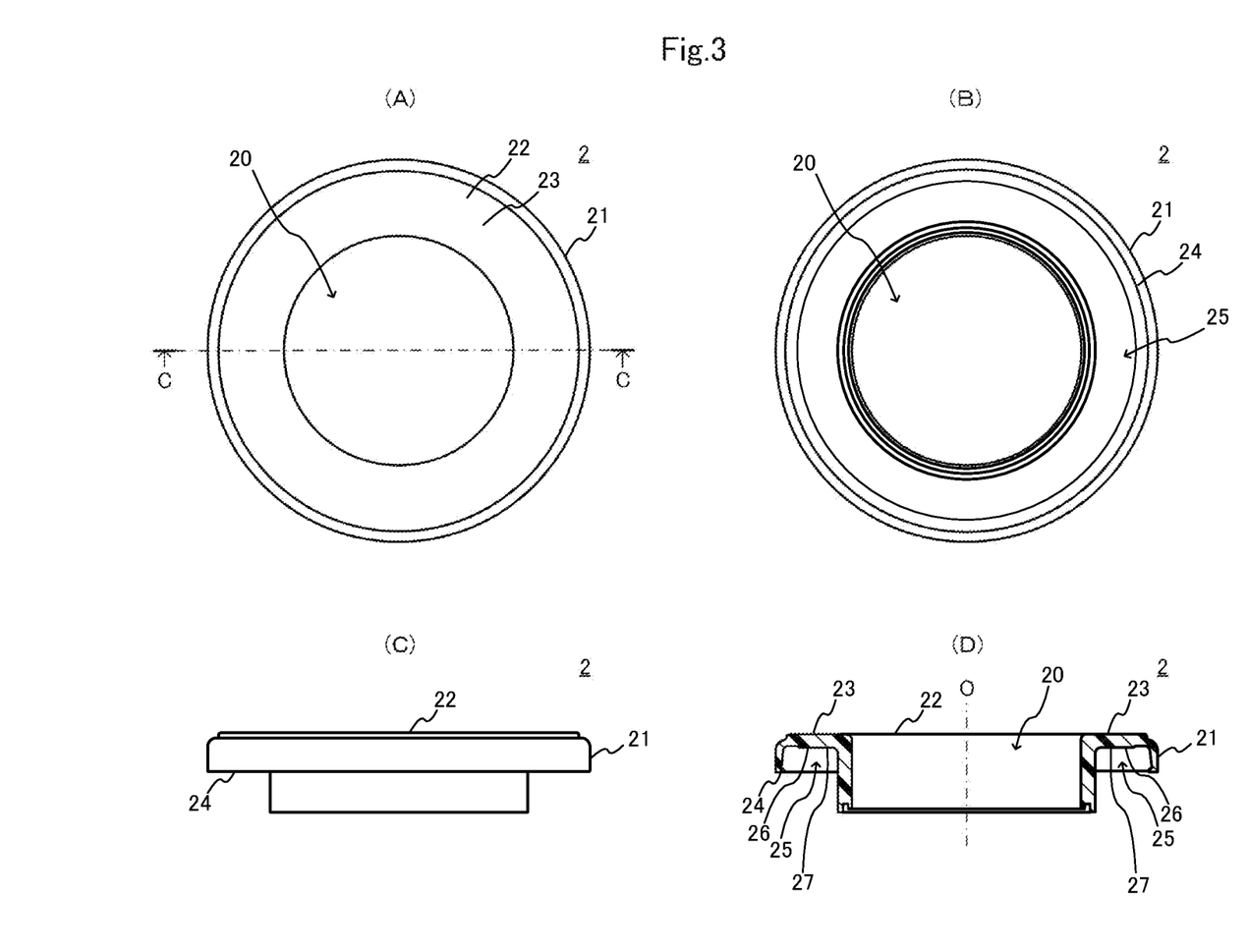
FIG. 3(A), FIG. 3(B), and FIG. 3(C) are respectively a plan view, a bottom view, and a front view, of an upper case 2.
FIG. 3(D) is a C-C cross sectional view of the upper case 2 as illustrated in FIG. 3(A).

FIG. 3(A), FIG. 3(B), and FIG. 3(C) are respectively a plan view, a bottom view, and a front view, of the upper case 2, and FIG. 3(D) is a C-C cross sectional view of the upper case 2 as illustrated in FIG. 3(A).

As illustrated in the figures, the upper case 2 has the following: a upper case body 21 in a substantial annular shape, including an insertion hole 20 for insertion of the shock absorber; an attachment surface 23 formed on an upper surface 22 of the upper case body 21 and intended for attachment of the slide bearing 1 onto the upper mount; and an annular recess section 25 formed on a lower surface 24 of the upper case body 21 so as to be rotatably combined with the lower case 3 to create the annular space 7.

A bottom 26 inside the annular recess section 25 is provided with a load transmission surface 27 which forms an upper interior surface of the annular space 7. The load transmission surface 27 is to transmit the load of the vehicle body applied onto the suspension to the sliding sheet 5 and the center plate 4.

The lower case 3 is made of thermoplastics, such as polyamide resin and is, with the shock absorber of the suspension inserted therein, attached to an upper spring seat (not illustrated in the figures) for supporting an upper end of a coil spring (not illustrated in the figures) of the suspension.

Figure 4:
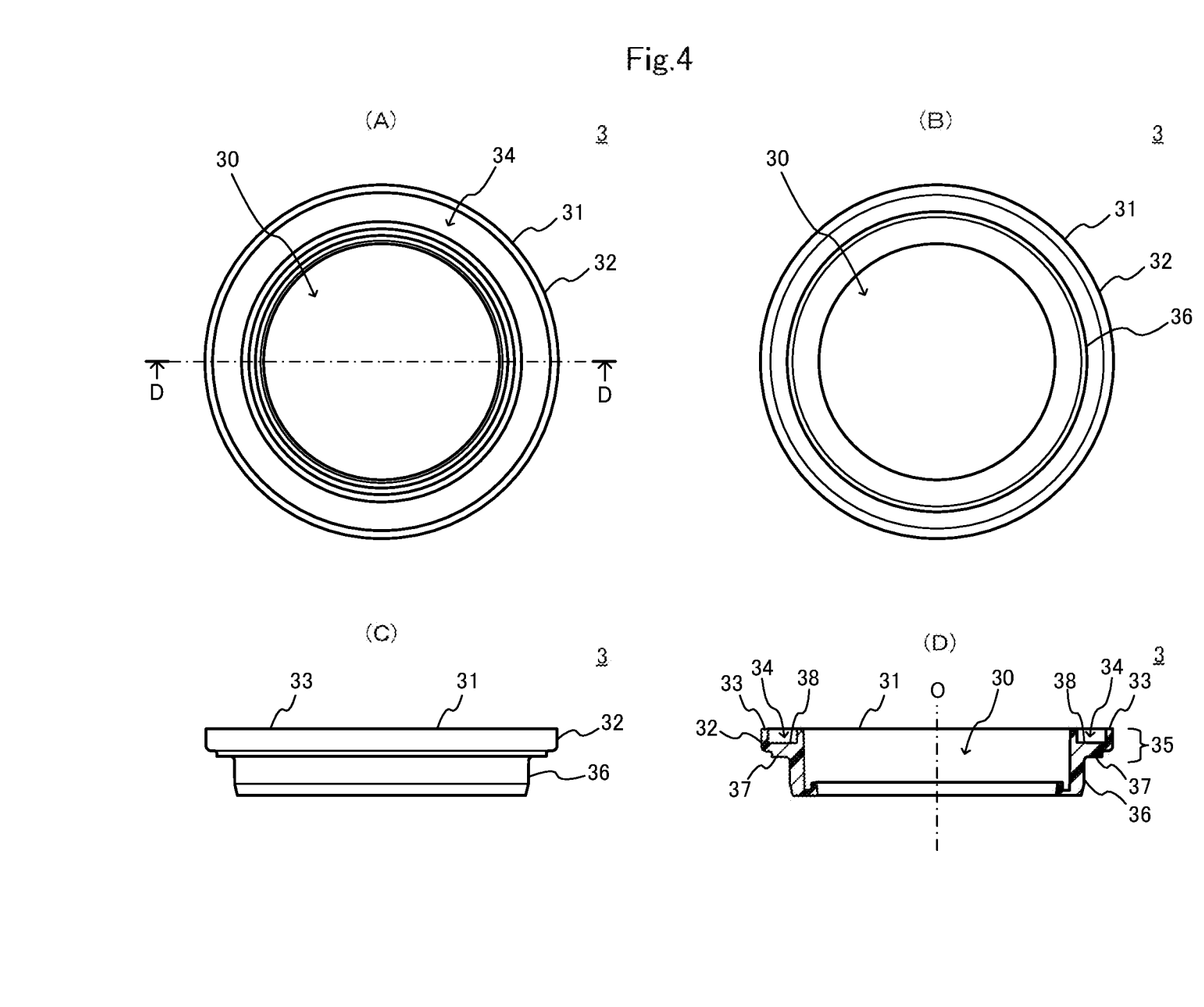
FIG. 4(A), FIG. 4(B), and FIG. 4(C) are respectively a plan view, a bottom view, and a front view, of a lower case 3.
FIG. 4(D) is a D-D cross sectional view of the lower case 3 as illustrated in FIG. 4(A).

FIG. 4(A), FIG. 4(B), and FIG. 4(C) are respectively a plan view, a bottom view, and a front view, of the lower case 3, and FIG. 4(D) is a D-D cross sectional view of the lower case 3 as illustrated in FIG. 4(A).

As illustrated in the figures, the lower case 3 has the following: a lower case body 31 in a substantial cylindrical shape, including an insertion hole 30 for insertion of the shock absorber; a flange part 32 which is formed on an upper end part 35 side of the lower case body 31 so as to project radially outwardly from an outer peripheral surface 36 of the lower case body 31; and an annular recess section 34 which is formed on an upper surface 33 of the flange part 32 and which is, upon rotatable combination of the lower case 3 with the upper case 2, held within the annular recess section 25 formed on the lower surface 24 of the upper case body 21 of the upper case 2 and thereby creates the annular space 7. The upper spring seat is attached to a lower surface 37 of the flange part 32.

The center plate 4 is made of elastic material excellent in sliding properties. Example of such the elastic material may include, but not limited to, polyolefin based thermoplastic elastomer, polyester based thermoplastic elastomer, polyurethane based thermoplastic elastomer, and polyamide based thermoplastic elastomer; to each of which lubricant, such as PTFE (polytetrafluoroethylene), lubricating oil, and silicone, may be added as necessary. The center plate 4 is placed within the annular recess section 34 formed on the upper surface 33 of the flange part 32 of the lower case 3, and is capable supporting the load of the vehicle body that is applied to the suspension and then transmitted through the load transmission surface 27 in the annular recess section 25 of the upper case 2 forming the annular space along with this annular recess section 34, and the sliding sheet 5 (See FIG. 2).

Figure 5:
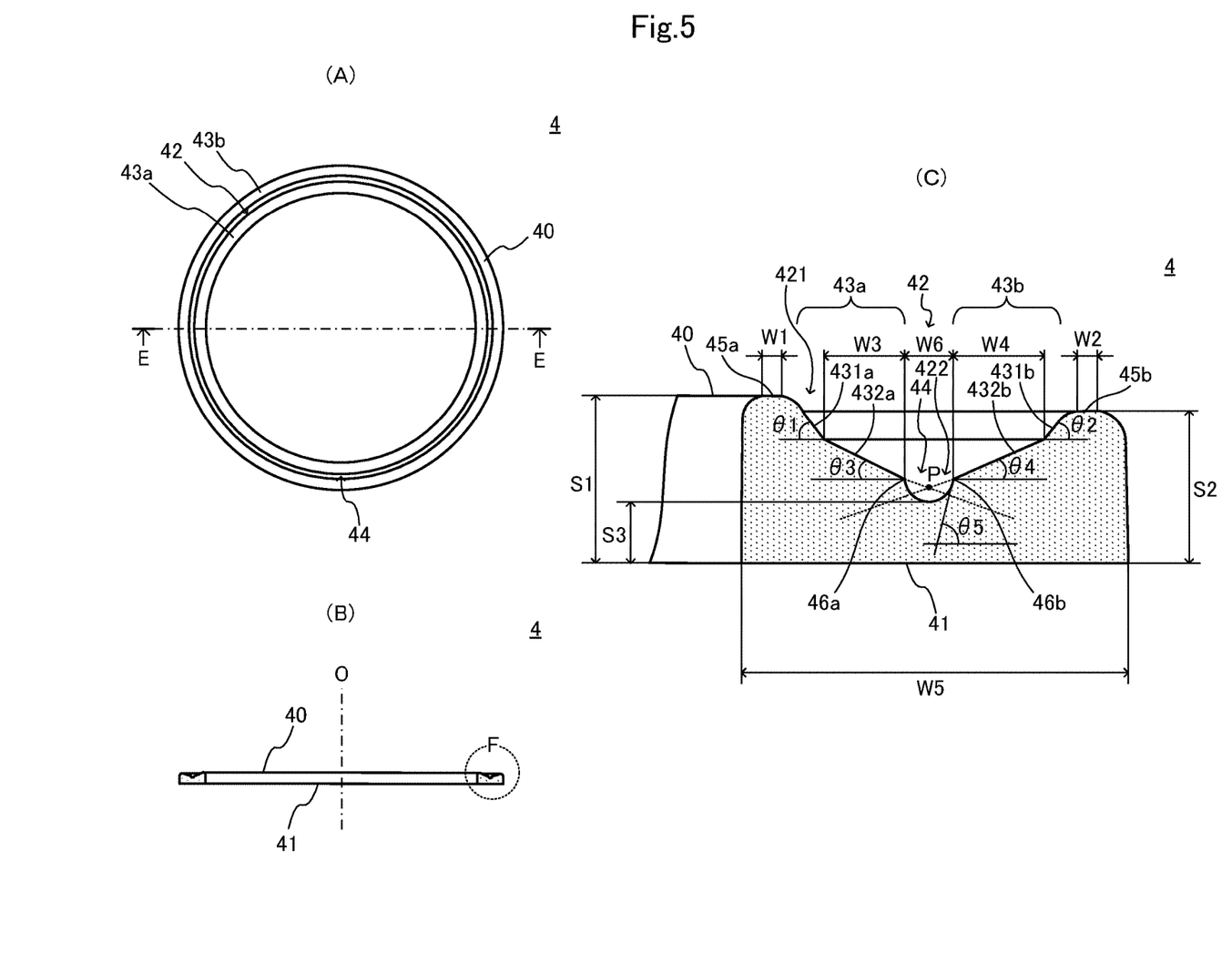
FIG. 5(A) is a plan view of a center plate 4.
FIG. 5(B) is an E-E cross sectional view of the center plate 4 as illustrated in FIG. 5(A)
FIG. 5(C) is an enlarged view of the part F of the center plate 4 as illustrated in FIG. 5(B).

FIG. 5(A) is a plan view of the center plate 4, FIG. 5(B) is an E-E cross sectional view of the center plate 4 as illustrated in FIG. 5(A), and FIG. 5(C) is an enlarged view of the part F of the center plate 4 as illustrated in FIG. 5(B).

As illustrated in the figures, the center plate 4, which is an annular object, includes a bearing surface 40 for supporting the load applied through the load transmission surface 27 formed on the bottom 26 inside the annular recess section 25 of the upper case 2 and the sliding sheet 5, a back face 41 that is a surface located opposite the bearing surface 40, and an annular groove 42 formed on the bearing surface 40 so as to hold the lubricant, such as lubricating grease.

The annular groove 42 includes an inner circumferential surface 43a inclining down from an opening section 421 toward a groove bottom section 422 as it goes outwardly in a radial direction, an outer circumferential surface 43b inclining down from the opening section to the groove bottom section as it goes inwardly in the radial direction, and an annular recess section 44 formed on an area including a line P of intersection between the inner circumferential surface 43a and the outer circumferential surface 43b.

The inner circumferential surface 43a includes a first inner inclined surface 431a located on the radial inside and a second inner inclined surface 432a located on the radial outside of the first inner inclined surface 431a and having a gentler slope than the first inner inclined surface 431a. The outer circumferential surface 43b includes a first outer inclined surface 431b located on the radial outside and a second outer inclined surface 432b located on the radial inside of the first outer inclined surface 431b and having a gentler slope than the first outer inclined surface 431b.

Here, the line P of intersection between the second inner inclined surface 432a within the inner circumferential surface 43a and the second outer inclined surface 432b within the outer circumferential surface 43b, is located closer to the bearing surface 40 than to the back face 41. The second inner inclined surface 432a within the inner circumferential surface 43a is continuous with an inner edge 46a of the annular recess section 44, while the second outer inclined surface 432b within the outer circumferential surface 43b is continuous with an outer edge 46b of the annular recess section 44. A thickness S1 at an opening-side rim 45a of the first inner inclined surface 431a within the inner circumferential surface 43a (a distance from the back face 41 to the opening-side rim 45a) is larger than a thickness S2 at an opening-side rim 45b of the first outer inclined surface 431b within the outer circumferential surface 43b (a distance from the back face 41 to the opening-side rim 45b).

In addition to the aforementioned S1 and S2, given S3 representing a thickness measured at the annular recess section 44 (i.e. a distance from the back face 41 to the annular recess section 44), W1 and W2 representing respectively radial widths of flat areas of the opening-side rims 45a and 45b, W3 representing a radial width of the second inner inclined surface 432a, W4 representing a radial width of the second outer inclined surface 432b, W5 representing a radial width of the bearing surface 40, W6 representing a radial width of the annular recess section 44, θ1 representing an angle between the first inner inclined surface 431a and the back face 41, θ2 representing an angle between the first outer inclined surface 431b and the back face 41, θ3 representing an angle between the second inner inclined surface 432a and the back face 41, θ4 representing an angle between the second outer inclined surface 432b and the back face 41; and θ5 representing an angle between a side wall of the annular recess section 44 and the back face 41, as illustrated in FIG. 5(C), then each parts S1 to S3, W1 to W6, and θ1 to θ5 of the center plate 4 has a dimension determined as exemplified in the following table 1.

TABLE 1

| | |
|---|---|
| S1 | 2.0 mm or more |
| S1-S2 | within range of 0.05 mm to 0.1 mm |
| S3 | 0.9 mm or more |
| W1, W2 | 0.15 mm or more |
| (W3 + W4 + W6)/W5 * 100 | within range of 50% to 70% |
| θ1, θ2 | within range of 35 degrees to 55 degrees (preferably within range of 40 degrees to 45 degrees) |
| θ3, θ4 | within range of 10 degrees to 35 degrees (preferably within range of 20 degrees to 25 degrees) |
| θ5 | within range of 50 degrees to 80 degrees (preferably within range of 60 degrees to 75 degrees) |

The back face 41, which is a flat surface, faces toward and comes into a contact with a groove bottom 38 inside the annular recess section 34.

The sliding sheet 5 is made of thermoplastics excellent in sliding properties, including a fluorine resin, such as PTFE and Modified PTFE obtained by copolymerization of TFE (tetrafluoroethylene) and a trace of other material (comonomers), polyacetal resin, polyethylene resin, polyamide resin, and polyphenylene sulfide resin; lubricant, including PTFE (with the proviso that the case of using PTFE or Modified PTFE as the thermoplastics material is excluded), lubricating oil, silicone, and graphite, and/or reinforcement material, including aramid fibers, glass fibers, and carbon fibers, are added thereto as necessary. Alternatively, the sliding sheet 5 may be made of metal material excellent in sliding properties, such as Brass alloy. Within the annular space 7, the sliding sheet 5 is placed between the bearing surface 40 of the center plate 4 and the load transmission surface 27 of the upper case 2.

Figure 6:
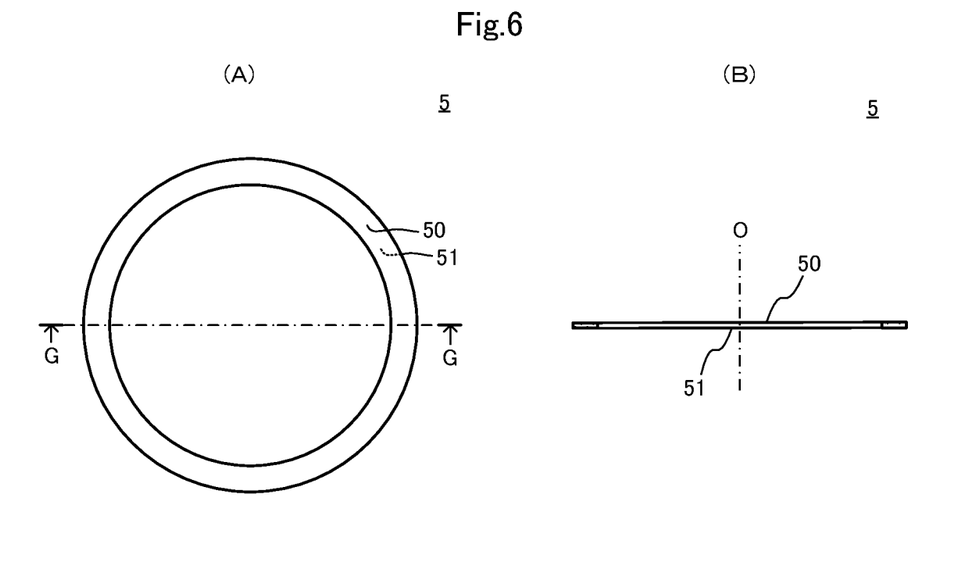
FIG. 6(A) is a plan view of a sliding sheet 5.
FIG. 6(B) is a G-G cross sectional view of the sliding sheet 5 as illustrated in FIG. 6(A).

FIG. 6(A) is a plan view of the sliding sheet 5, and FIG. 6(B) is a G-G cross sectional view of the sliding sheet 5 as illustrated in FIG. 6(A).

As illustrated in the figures, the sliding sheet 5, which is an annular object with a cross section in the direction of the axis O formed into a substantial flat plate shape, has a contact surface 50 to come into a contact with the load transmission surface 27 formed on the bottom 26 inside the annular recess section 25 of the upper case 2, and a sliding surface 51 located opposite the contact surface 50 so as to come into a slidable contact with the bearing surface 40 of the center plate 4. Slidable contact between the sliding surface 51 of the sliding sheet 5 and the bearing surface 40 of the center plate 4 allows free rotational motion between the upper case 2 and the lower case 3.

The dust seal 6, which is made of elastic material, such as urethane resin, is attached to the flange part 32 of the lower case body 31 of the lower case 3, thereby sealing a space which is formed between the upper case 2 and the lower case 3 and leads to the annular space 7, as illustrated in FIG. 2.

Figure 7:
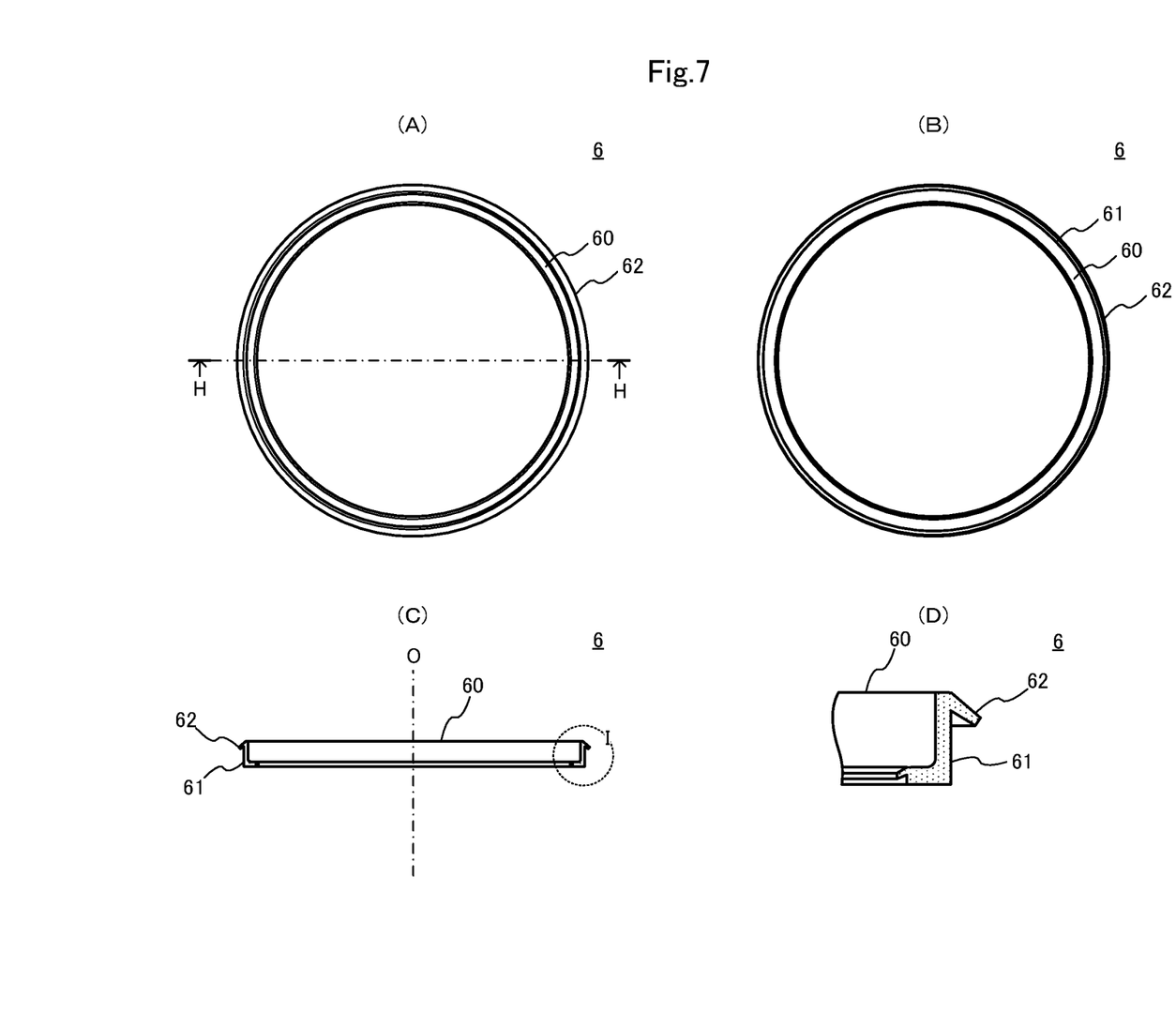
FIG. 7(A) and FIG. 7(B) are respectively a plan view and a bottom view of a dust seal 6.
FIG. 7(C) is an H-H cross-sectional view of the dust seal 6 as illustrated in FIG. 7(A)
FIG. 7(D) is an enlarged view of the part I of the dust seal 6 as illustrated in FIG. 7(C).

FIG. 7(A) and FIG. 7(B) are respectively a plan view and a bottom view of the dust seal 6, FIG. 7(C) is an H-H cross sectional view of the dust seal 6 as illustrated in FIG. 7(A), and FIG. 7(D) is an enlarged view of the part I of the dust seal 6 as illustrated in FIG. 7(C).

As illustrated in the figures, the dust seal 6 includes a dust seal body 60 in a substantial cylinder to be attached to the flange part 32 of the lower case body 31 of the lower case 3 and a lip part 62 in a substantial annular shape extending from an outer peripheral surface of the dust seal body 60 outwardly in a radial direction. The lip part 62 abuts an inner wall 28 on the outer peripheral side of the annular recess section 25 of the upper case 2 while the dust seal body 60 is attached to the flange part 32 of the lower case body 31 of the lower case 3. This cause the space formed between the upper case 2 and the lower case 3 leading to the annular space 7 to be sealed, thereby preventing intrusion of dust into this annular space 7 (See FIG. 2).

Hereinabove, the embodiment of the present invention has been described.

According to the present embodiment, the center plate is placed within the annular recess section 34 of the lower case 3 forming the annular space 7 along with the annular recess section 25 of the upper case 2, and has the bearing surface 40 for supporting the load to be applied through the load transmission surface 27 inside the annular recess section 25 of the upper case 2 and the sliding sheet 5. Moreover, the sliding sheet 5 is placed within the annular space 7 and between the bearing surface 40 of the center plate 4 and the load transmission surface 27 of the upper case 2, and has the sliding surface 51 in a slidable contact with the bearing surface 40 of the center plate 4. In addition, the upper case 2 and the lower case 3 are combined with each other so as to be rotatable relatively due to the interposition of the center plate 4 and the sliding sheet 5 between the cases 2, 3. This enables the slide bearing 1 to support the load of the vehicle applied to the suspension while allowing rotational motion of the shock absorber of the suspension inserted in the holding hole 10.

According to the present embodiment, the bearing surface 40 of the center plate 4 is provided with the annular groove 42 for holding the lubricant, such as lubricating grease, and this annular groove 42 has the inner circumferential surface 43a inclining down from the opening section toward the groove bottom section as it goes outwardly in the radial direction, and the outer circumferential surface 43b inclining down from the opening section toward the groove bottom section as it goes inwardly in the radial direction. Consequently, when the load is applied to the slide bearing 1 to push the center plate 4 against the sliding sheet 5, the inner circumferential surface 43a becomes bent inwardly in the radial direction to contact with the sliding surface 51 of the sliding sheet 5 and the outer circumferential surface 43b becomes bent outwardly in the radial direction to contact with the sliding surface 51 of the sliding sheet 5, in the annular groove 42 formed on the bearing surface 40 of the center plate 4. The line P of intersection between the inner circumferential surface 43a and the outer circumferential surface 43b is located closer to the bearing surface 40 than to the back face 41; therefore, the inner circumferential surface 43a and the outer circumferential surface 43b each slope gently with respect to a surface perpendicular to the axis O, and the inner circumferential surface 43a is capable of bending easily inwardly in the radial direction and the outer circumferential surface 43b is capable of bending easily outwardly in the radial direction, under the application of a load in the direction of the axis O (i.e. a load in a thrust direction). Consequently, pushing the center plate 4 against the sliding sheet 5 increases a contact area between the center plate 4 and the sliding sheet 5 to provide a more improved sealability for sealing in the lubricant filled in the annular groove 42; this preventing the lubricant on the bearing surface 40 from being pushed out even if the center plate 4 and the sliding sheet 5 subject to offset load, thus reducing loss of the lubricant filled in the annular groove 42. This enables a sliding performance to be kept over long period.

According to the present embodiment, inside the annular groove 42 on the bearing surface 40 of the center plate 4, the inner circumferential surface 43a includes the first inner inclined surface 431a located on the radial inside and the second inner inclined surface 432a located on radial outside of the first inner inclined surface 431a and having a gentler slope than the first inner inclined surface 431a, while the outer circumferential surface 43b includes the first outer inclined surface 431b located on the radial outside and the second outer inclined surface 432b located on the radial inside of the first outer inclined surface 431b and having a gentler slope than the first outer inclined surface 431b. This ensures as follows when the load on the slide bearing 1 pushes the center plate 4 against the sliding sheet 5: the inner circumferential surface 43a becomes bent easily inwardly in the radial direction, so that a face in a contact with the sliding surface 51 of the sliding sheet 5 becomes closer to flat face, while the outer circumferential surface 43b becomes bent easily outwardly in the radial direction, so that a face in a contact with the sliding surface 51 of the sliding sheet becomes closer to flat face; thereby resulting in reduction of a partial load. In addition, the annular groove 42 grows in capacity, resulting in an increase in retaining amount of the lubricant. Consequently, it is ensured to keep a sliding performance for longer period.

In the present embodiment, the back face 41 of the center plate 4 is a flat surface. Consequently, when the load is applied to the slide bearing 1 to push the center plate 4 against the sliding sheet 5, the center plate 4 becomes more largely deformed on the bearing surface 40 side than that on the back face 41 side, resulting in an increase in the contact area between the center plate 4 and the sliding sheet 5. This provides further an improved sealability for sealing in the lubricant filled in the annular groove 42, therefore enabling a sliding performance to be kept for longer period.

According to the present embodiment, the annular groove 42 formed on the bearing surface 40 of the center plate 4 includes the annular recess section 44 which is formed on the area including the line P of intersection between the inner circumferential surface 43a and the outer circumferential surface 43b so that the inner edge 46a is continuous with the inner circumferential surface 43a and the outer edge 46b is continuous with the outer circumferential surface 43b. This annular recess section 44 causes the inner circumferential surface 43a to become more easily bent inwardly in the radial direction and the outer circumferential surface 43b to become more easily bent outwardly in the radial direction, under the load in the direction of the axis O, therefore providing a further improved sealability for sealing in the lubricant filled in the annular groove 42. This enables a sliding performance to be kept for longer period.

According to the present embodiment, for the annular groove 42 formed on the bearing surface 40 of the center plate 4, the thickness S1 at the opening-side rim 45a of the inner circumferential surface 43a is larger than the thickness S2 at the opening-side rim 45b of the outer circumferential surface 43b. Any cylindrical member with flange formed on one end is usually used as the upper spring seat, and mounting it onto the lower case body 31 of the lower case 3 causes the flange to be attached to the lower surface 37 of the flange part 32 of the lower case 3. The coil spring is designed to be larger than an outer diameter of a cylindrical part of the upper spring seat in order to avoid an unnecessary contact with the cylindrical part of the upper spring seat. This causes a contact location between the upper end of the coil spring and the flange of the upper spring seat to be present on an outer peripheral area of the center plate 4, and therefore more amount of reaction force from the coil spring seems likely to be transmitted to the outer peripheral area of the center plate 4, namely, to the opening-side rim 45b of the outer circumferential surface 43b than to the opening-side rim 45a of the inner circumferential surface 43a, in and around the annular groove 42 formed on the bearing surface 40 of the center plate 4. As described above, the thickness S1 at the opening-side rim 45a of the inner circumferential surface 43a inside the annular groove 42 is, however, larger than the thickness S2 at the opening-side rim 45b of the outer circumferential surface 43b, and therefore a higher compression is applied to the opening-side rim 45a of the inner circumferential surface 43a in comparison with if the thickness S1 at the opening-side rim 45a of the inner circumferential surface 43a is equal to the thickness S2 at the opening-side rim 45b of the outer circumferential surface 43b, namely, enough compression is applied to the opening-side rim 45a of the inner circumferential surface 43a as with on the opening-side rim 45b of the outer circumferential surface 43b, thereby achieving more even distribution of the load to be applied to the bearing surface 40. Consequently, the sealability for sealing in the lubricant filled in the annular groove 42 increases further, thus enabling a sliding performance to be kept for longer period.

The present invention can include, but is not limited to, the above embodiment: it will be obvious to those skilled in the art that various changes may be made without departing from the scope of the invention.

Figure 8:
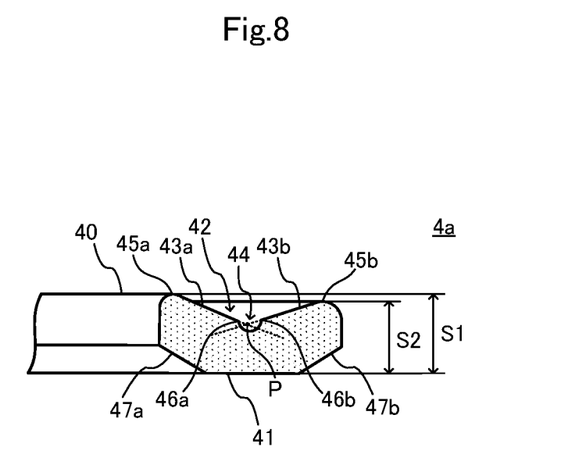
FIG. 8 is a diagram for explanation about a modification 4a of the center plate 4, which is a view (an enlarged view of an equivalent of the part F in FIG. 5(B)) corresponding to FIG. 5(C).

For example, as in a modification 4a of the center plate 4 as illustrated in FIG. 8, an inner edge and an outer edge of the back face 41 may be provided with tapers 47a and 47b, respectively. Using this design allows, for the annular groove 42 formed on the bearing surface 40, the inner circumferential surface 43a to become more easily bent inwardly in the radial direction and the outer circumferential surface 43b to become more easily bent outwardly in the radial direction, under the load in the direction of the axis O, therefore providing a further improved sealability for sealing in the lubricant filled in the annular groove 42. This enables the sliding performance to be kept for longer period. The tapers 47a, 47b at the inner edge and the outer edge of the back face 41 each may come into a contact with the groove bottom 38 inside the annular recess section 34 of the lower case body 31 upon the load on the bearing surface 40 in the modification 4a of the center plate 4.

Figure 9:
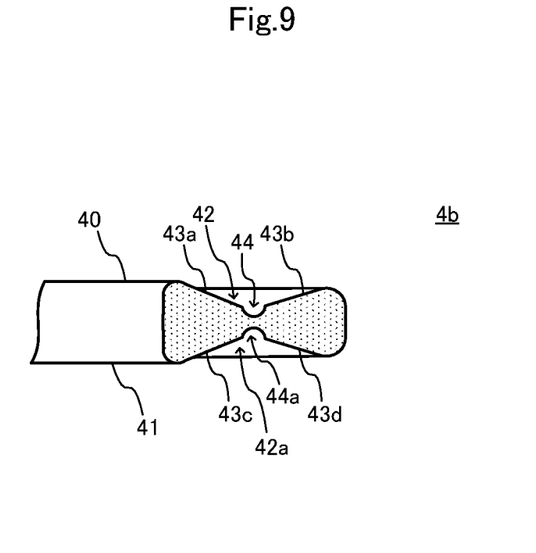
FIG. 9 is a diagram for explanation about a modification 4b of the center plate 4, which is a view (an enlarged view of an equivalent of the part F in FIG. 5(B)) corresponding to FIG. 5(C).

As in a modification 4b of the center plate 4 as illustrated in FIG. 9, not only the bearing surface 40 but also the back face 41 may be provided with the annular groove 42a including the following: an inner circumferential surface 43c inclining from the opening section toward the bearing surface as it goes outwardly in the radial direction; an outer circumferential surface 43d inclining from the opening section toward the bearing surface as it goes inwardly in the radial direction; and an annular recess section 44a connecting between the inner circumferential surface 43c and the outer circumferential surface 43d. Using this design enables the back face 41 to hold a lubricant, such as lubricating grease, thereby achieving a further improved sliding performance.

Figure 10:
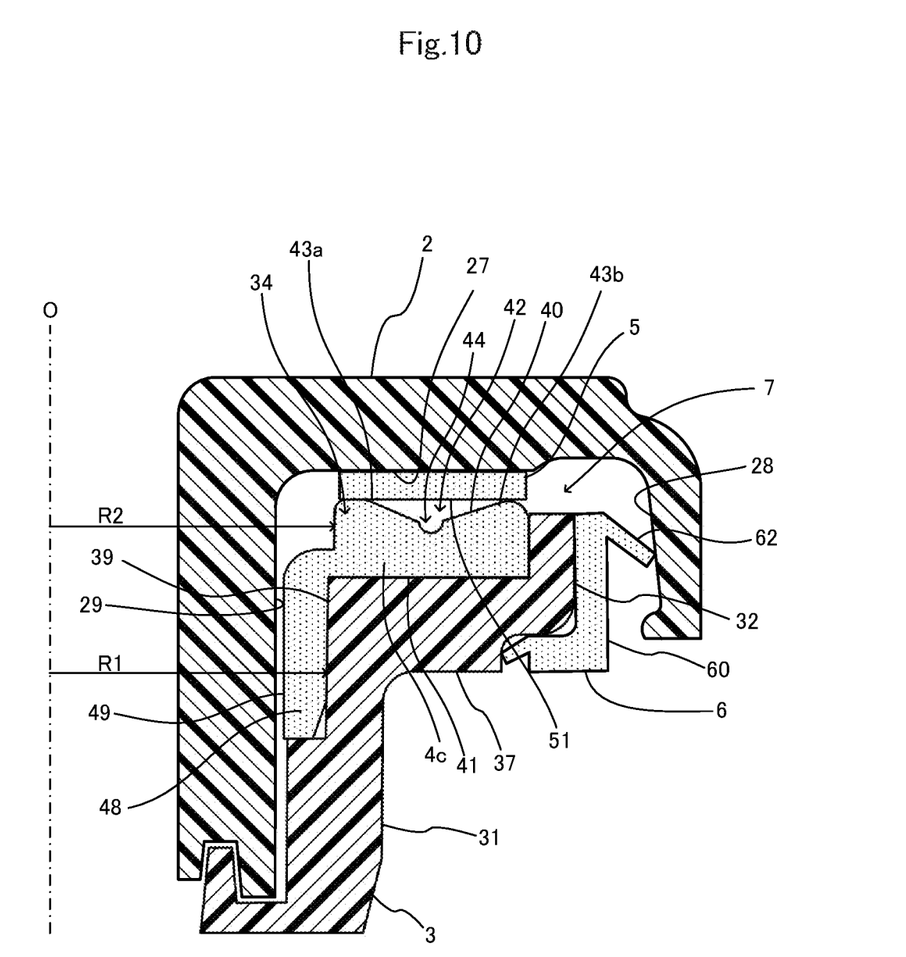
FIG. 10 is a diagram for explanation about a modification of the slide bearing 1, which is a view (an enlarged view of an equivalent of the part B in FIG. 1(D)) corresponding to FIG. 2.
Figure 11:
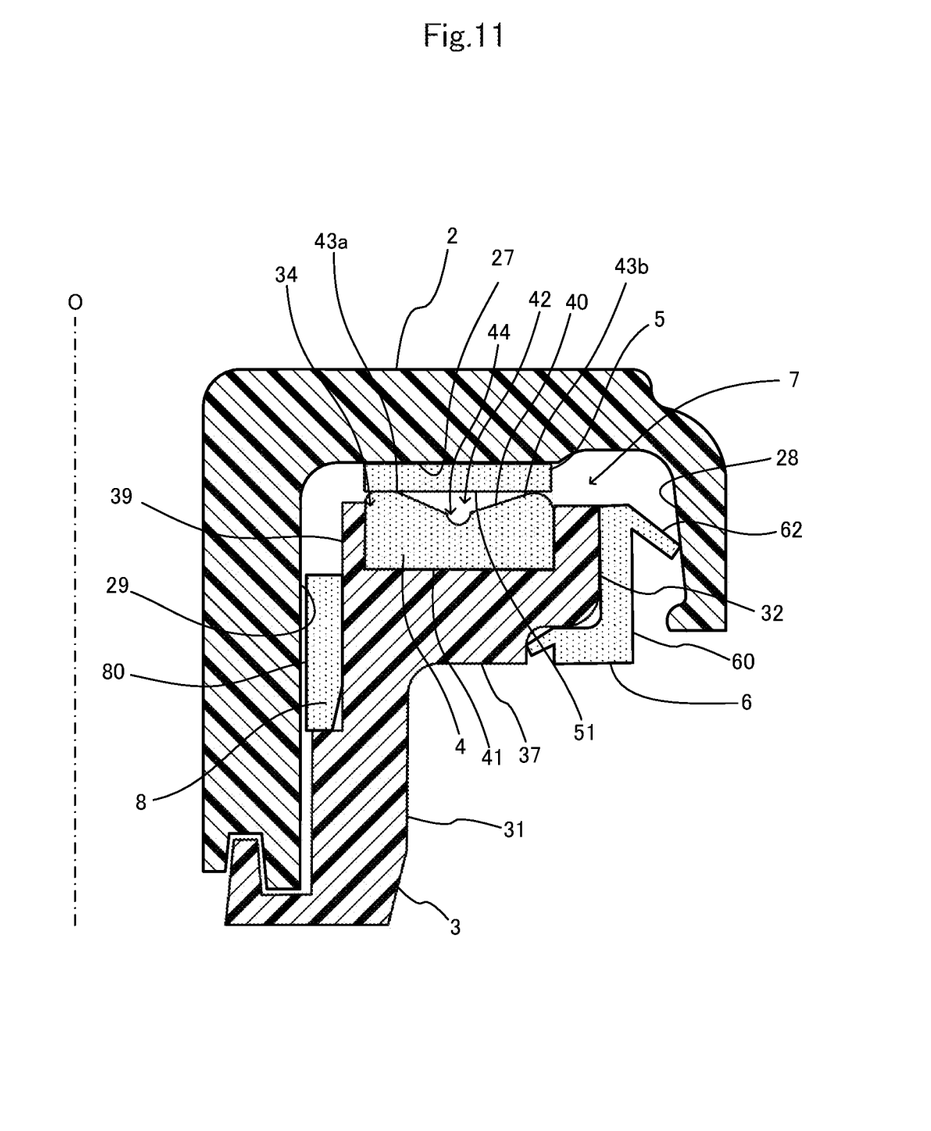
FIG. 11 is a diagram for explanation about a modification of the slide bearing 1, which is a view (an enlarged view of an equivalent of the part B in FIG. 1(D)) corresponding to FIG. 2.

For the above embodiments, as illustrated in FIG. 2, the bearing surface 40 formed on the center plate 4 supports the load in the thrust direction (i.e. in the direction of the axis O), but not limited thereto; as in a modification 4c of the center plate 4 as illustrated in FIG. 10, the back face 41 may be provided with a boss 48 integrally formed at the inner edge of the back face 41 and having an inner peripheral surface with a bearing surface 49 slidable with an inner wall 29 on the inner peripheral side of the annular recess section 25 of the upper case 2. This boss 48 may be placed between the inner wall 29 on the inner peripheral side of the annular recess section 25 of the upper case 2 and an inner peripheral surface 39 of the lower case body 31 of the lower case 3 in order to support a load in the radial direction (in a direction perpendicular to the axis O) using the bearing surface 49 in addition to supporting the load in the thrust direction using the bearing surface 40. In addition, an outer diameter R1 of the boss 48 may be smaller than an inner diameter R2 of the center plate 4c. Alternatively, as illustrated in FIG. 11, a bushing 8 having an inner peripheral surface with a sliding surface 80 in a slidable contact with the inner wall 29 on the inner peripheral side of the annular recess section 25 of the upper case 2, may be arranged between the inner wall 29 on the inner peripheral side of the annular recess section 25 of the upper case 2 and the inner peripheral surface 39 of the lower case body 31 of the lower case 3, thereby supporting the load in the radial direction using the bushing 8 in addition to supporting the load in the thrust direction using the center plate 4.

For the above embodiments, as illustrated in FIG. 2, the center plate 4 is placed on the lower case 3 side of the inside of the annular space 7 with the bearing surface 40 upward, while the sliding sheet 5 is placed on the upper case 2 side of the inside of the annular space 7 with the sliding surface 51 downward. The scope of the present invention, however, is not limited in this respect. The center plate 4 may be placed on the upper case 2 side of the inside of the annular space 7 with the bearing surface 40 downward, and the sliding sheet 5 may be placed on the lower case 3 side of the inside of the annular space 7 with the sliding surface 51 upward.

The present invention is widely applicable to slide bearing for supporting a load, in various mechanisms, including the suspension of the vehicle.

REFERENCE SIGNS LIST

1: slide bearing, 2: upper case, 3: lower case, 4, 4a, 4b, 4c: center plate, 5: sliding sheet, 6: dust seal, 7: annular space, 8: bushing, 10: holding hole of the slide bearing 1, 20: insertion hole of the upper case 2, 21: upper case body, 22: upper surface of the upper case body 21, 23: attachment surface of the upper case body 21, 24: lower surface of the upper case body 21, 25: annular recess section of the upper case body 21, 26: bottom inside the annular recess section 25, 27: load transmission surface of the upper case 2, 28: inner wall on the outer peripheral side of the annular recess section 25, 29: inner wall on the inner peripheral side of the annular recess section 25, 30: insertion hole of the lower case 3, 31: lower case body, 32: flange part of the lower case body 31, 33: upper surface of the flange part 32, 34: annular recess section of the lower case body 31, 35: upper end prat of the lower case body 31, 36: outer peripheral surface of the lower case body 31, 37: lower surface of the flange part 32, 38: groove bottom inside the annular recess section 34, 39: inner peripheral surface of the lower case body 31, 40: bearing surface of the center plate 4, 41: back face of the center plate 4, 42: annular groove on the bearing surface 40 42a: annular groove on the back face 41, 43a: inner circumferential surface inside the annular groove 42, 43b: outer circumferential surface inside the annular groove 42, 43c: inner circumferential surface of the annular groove 42a, 43d: outer circumferential surface inside the annular groove 42a, 44: annular recess section in the annular groove 42, 44a: annular recess section in the annular groove 42a, 45a: opening-side rim of the inner circumferential surface 43a, 45b: opening-side rim of the outer circumferential surface 43b, 46a: inner edge of the annular recess section 44, 46b: outer edge of the annular recess section 44, 47a, 47b: taper of the back face 41, 48: boss, 49: bearing surface, 50: contact surface of the sliding sheet 5, 51: sliding surface of the sliding sheet 5, 60: dust seal body of the dust seal 6, 61: outer peripheral surface of the dust seal body 60, 62: lip part of the dust seal 6, 80: bearing surface, 431a: first inner inclined surface, 431b: first outer inclined surface, 432a: second inner inclined surface, 432b: second outer inclined surface.

The invention claimed is:

1. A slide bearing for supporting a load, comprising:
an upper case;
a lower case combined with the upper case;
a center plate in a substantial annular shape, being located between the upper case and the lower case; and
a sliding sheet in a substantial annular shape, being located between the center plate and the upper case or between the center plate and the lower case,
the center plate comprising:
a bearing surface slidable with the sliding sheet;
a back face being located on an opposite side from the bearing surface; and
an annular groove formed on the bearing surface,
the annular groove comprising:
an annular recess section as a groove bottom section of the annular groove;
an inner circumferential surface being continuous with an inner edge of the annular recess section and with the bearing surface to incline inwardly in the radial direction from the inner edge of the annular recess section toward the bearing surface; and
an outer circumferential surface being continuous with an outer edge of the annular recess section and with the bearing surface to incline outwardly in the radial direction from the outer edge of the annular recess section toward the bearing surface,
an intersection between an extension of the inner circumferential surface and an extension of the outer circumferential surface forming a circle and being positioned closer to the bearing surface than to the back face of the center plate,
the annular recess section reaching deeper from the bearing surface than a position of the circle of the intersection.

2. A slide bearing according to claim 1, wherein the back face of the center plate is a flat.

3. A slide bearing according to claim 2, wherein the center plate further comprises a taper formed at each of inner and outer edges of the back face.

4. A slide bearing according to claim 3, wherein:
for the bearing surface, a distance from the back face to an inner rim is larger than a distance from the back face to an outer rim.

5. A slide bearing according to claim 2, wherein:
for the bearing surface, a distance from the back face to an inner rim is larger than a distance from the back face to an outer rim.

6. A slide bearing according to claim 1, wherein the center plate further comprises a taper formed at each of inner and outer edges of the back face.

7. A slide bearing according to claim 6, wherein:
for the bearing surface, a distance from the back face to an inner rim is larger than a distance from the back face to an outer rim.

8. A slide bearing according to claim 1, wherein:
for the bearing surface, a distance from the back face to an inner rim is larger than a distance from the back face to an outer rim.

9. A slide bearing according to claim 1, wherein the center plate is made of elastic material.

10. A slide bearing according to claim 1, further comprising a sealing member separating a space between the upper case and the lower case from outside.

11. A slide bearing according to claim 1, wherein:
the slide bearing is configured to support the load on a shaft member while allowing rotational motion of the shaft member;
the upper case is configured to be, with the shaft member inserted in the upper case, attached to an object to be supported by the shaft member;
the lower case is combined with the upper case so as to be rotatable relative to the upper case with the shaft member inserted in the lower case; and the center plate and the sliding sheet are configured to be located between the upper case and the lower case with the shaft member inserted in the center plate and the sliding sheet.

\* \* \* \* \*